United States Patent [19]

Nakamura et al.

[11] 4,132,828

[45] Jan. 2, 1979

[54] ASSEMBLY OF METAL-COATED CARBON FIBERS, PROCESS FOR PRODUCTION THEREOF, AND METHOD FOR USE THEREOF

[75] Inventors: Kazuo Nakamura, Tokyo; Yoshito Fukube; Takashi Osaki, both of Chiba, all of Japan

[73] Assignees: Toho Beslon Co., Ltd., Tokyo; Nihon Shinku Gijutsu Kabushiki Kaisha, Chigasaki, both of Japan

[21] Appl. No.: 809,813

[22] Filed: Jun. 24, 1977

[30] Foreign Application Priority Data

Nov. 26, 1976 [JP] Japan .................... 51-141165

[51] Int. Cl.$^2$ ............................................ B05D 3/06
[52] U.S. Cl. ................................. 428/366; 75/0.5 R; 75/DIG. 1; 427/39; 427/113; 427/250; 428/367; 428/378; 428/381; 428/389
[58] Field of Search .................. 427/38, 39, 113, 250, 427/294; 428/367, 366, 375, 378, 381, 389; 75/0.5 R, 201, DIG. 1; 148/4

[56] References Cited

U.S. PATENT DOCUMENTS

| 3,535,093 | 10/1970 | Sara | 428/367 |
| 3,553,003 | 1/1971 | Carlton et al. | 428/367 |
| 3,860,443 | 1/1975 | Lachman et al. | 427/113 |
| 3,864,807 | 2/1975 | Schneider et al. | 148/4 |
| 4,056,874 | 11/1977 | Kalnin | 75/0.5 |

OTHER PUBLICATIONS

Chambers et al., "Research/Developement", May, 1971, pp. 32–35.
"Products Finishing", Nov., 1976, pp. 58, 59.

*Primary Examiner*—John H. Newsome
*Attorney, Agent, or Firm*—Sughrue, Rothwell, Mion, Zinn and Macpeak

[57] ABSTRACT

An assembly, useful in producing a carbon fiber-reinforced metal, of a plurality of carbon fibers each coated with a matrix metal layer, the fibers having bonded points at the metal layers to form a two-dimensional network structure or both a two-dimensional network structure and a three-dimensional network structure, produced advantageously by an ion plating process or a vacuum deposition process.

39 Claims, 8 Drawing Figures

ASSEMBLY OF METAL-COATED CARBON FIBERS, PROCESS FOR PRODUCTION THEREOF, AND METHOD FOR USE THEREOF

BACKGROUND OF THE INVENTION

1. Field of the Invention

This invention relates to an assembly of metal-coated carbon fibers, and a method for its use. More specifically, the invention relates to an assembly of metal-coated carbon fibers suitable for the production of carbon fiber-reinforced metal, a process for the production thereof, and a method for use thereof.

2. Description of the Prior Art

Composite materials of metals and reinforcing carbon fibers are useful as light-weight structural materials having both the high elasticity, high strength and light weight of the carbon fibers and the shapability, heat stability, electrical conductivity and heat conductivity of the metals. In the production of these composite materials, it is difficult to bond the reinforcing carbon fibers uniformly and firmly to the matrix metal, and mold them into the desired shape. This is because in the production of a carbon fiber-reinforced metal by mixing a molten metal matrix with carbon fibers (for example, as disclosed in U.S. Pat. No. 3,770,488), uniform mixing is difficult, and in the production of a composite material by laminating carbon fibers and a matrix metal foil and consolidating them under heat and pressure (for example, as disclosed in U.S. Pat. No. 3,888,661), the bond strength between the carbon fibers and the metal is low, and delamination tends to occur. Furthermore, in these methods, metals which tend to form carbides by reaction with carbon fibers reduce the strength of the composite materials.

Methods are also known in which a carbon fiber bundle dipped in molten metal in the production of carbon fiber-reinforced metal (for example, as disclosed U.S. Pat. Nos. 3,770,488 and 3,894,863) is used. Because of its low flexibility, the fiber bundle obtained by this process has poor operability in the production of a carbon fiber-reinforced metal of complicated shapes.

SUMMARY OF THE INVENTION

A first object of this invention is to provide an assembly of metal-coated carbon fibers having a novel structure.

A second object of the invention is to provide an assembly of metal-coated carbon fibers which have moderate flexibility and can be handled without deviations among the individual fibers, namely without changes in the directions of the individual fibers.

A third object of the invention is to provide an assembly of metal-coated carbon fibers in which the carbon fibers are dispersed uniformly in the matrix metal, which provides carbon fiber-reinforced metal having very good adhesion between the carbon fibers and metal, and which lend themselves to very good handling in the production of a carbon fiber-reinforced metal.

A fourth object of this invention is to provide a process for producing an assembly of metal-coated carbon fibers in accordance with this invention.

A fifth object of this invention is to provide a process for producing carbon fiber-reinforced metal using the assembly of metal-coated carbon fibers of this invention.

The present invention provides an assembly of a plurality of carbon fibers each coated with a matrix metal layer, the fibers having bonded points at the metal layers to form a two-dimensional network structure or both a two-dimensional network structure and a three-dimensional network structure. The metal-coated carbon fibers of this invention can be produced by depositing a metal on carbon fibers using an ion plating or vacuum deposition process.

BRIEF DESCRIPTION OF THE ACCOMPANYING DRAWINGS

FIGS. 1-a and 1-b are cross sectional views of metal-coated carbon fibers in the metal-coated carbon fiber assembly of this invention;

FIGS. 2-a and 2-b are views showing the bonded parts of metal-coated carbon fibers in the metal-coated carbon fiber assembly of this invention, FIG. 2-c being a sectional view of the bonded parts shown in FIG. 2-a;

All these drawings represent models of the articles described above.

DETAILED DESCRIPTION OF THE INVENTION

Figure 1A:
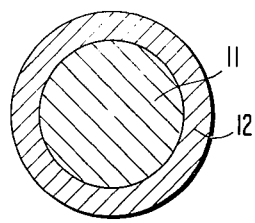
Figure 1B:
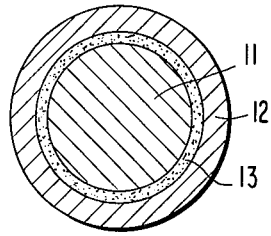
Figure 2A:
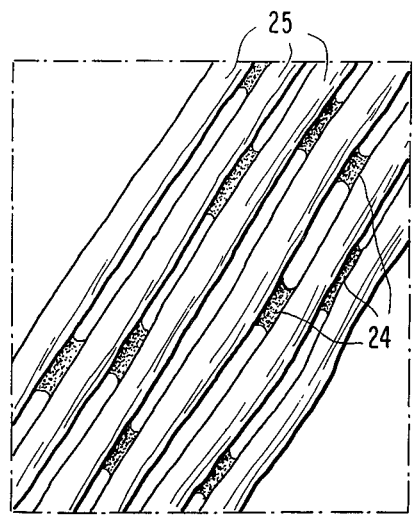
Figure 2B:
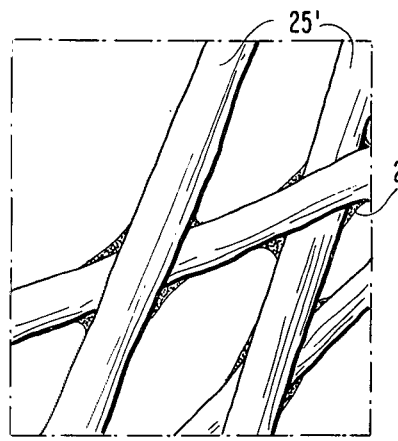
Figure 2C:
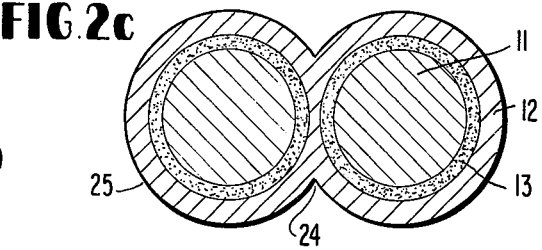

In the assembly of metal-coated carbon fibers of this invention, carbon fibers 11 each coated with a metal layer 12 as shown in FIG. 1-a form a network structure as shown in FIG. 2-a or 2-b. Specifically, the points of contact of the individual fibers coated with the metal are bonded by the matrix metal, and form a two-dimensional network structure or both a two-dimensional network structure and a three-dimensional network structure. The bonded points are present to such an extent that the relative positions of the carbon fibers do not substantially change as a result of changes in the orientation of the individual fibers.

Carbon fibers which constitute the metal-coated carbon fiber assembly of this invention may be produced by any method from any material. For example, they can be produced by methods disclosed in U.S. Pat. No. 3,677,705 in which a polyacrylonitrile fiber is stabilized in air and then is carbonized in an inert gas. Carbon fibers (low modulus) obtained by a carbonization treatment at about 800 to about 1,500° C., and graphite fibers (high modulus) obtained by calcining these carbon fibers at about 2,000 to about 3,000° C. can be used in the present invention. For example in the case of aluminium, the former do not decrease in strength if heated at a temperature below about 550° C. The latter are stable to metal and do not decrease in strength even if heated to about 700° C.

The length of each of the fibers constituting the assembly of this invention is not critical. The fibers may be long fibers, e.g., which can be, endless, but generally have a length of 15 cm or more, which permit the continuous production of an assembly, or short fibers (generally, about 1 to 15 cm in length) which can be used to form a web for example. The diameter of the fibers is also not critical but fibers generally available have a diameter of about 5 to about 10μ.

The metal used in this invention is selected depending on the end use of the metal-coated carbon fiber assembly of this invention. For example, aluminum or magnesium can be used when the assembly of this invention is molded under heat and pressure and used as a material for aircraft bodies or shipbuilding materials. Titanium or nickel is used when the assembly is to be used as a material for turbine blades or a high temperature high strength material. Copper, silver, gold, zinc, lead, tin, iron and cobalt are other useful metals.

When the matrix metal is one which tends to react with carbon fibers which are essentially carbon, or to dissolve the carbon fibers during their coating, during the production of carbon fiber-reinforced metal, or during the use of carbon fiber-reinforced metal (for example, aluminum, titanium, nickel, iron, and cobalt), an interlayer 13 is provided between the carbon fiber 11 and the matrix metal layer 12, as shown in FIG. 1-b. The interlayer is a layer of titanium or silicon or a carbide or nitride of titanium or silicon. When the matrix metal is the one which does not easily react with carbon fibers (for example, magnesium, zinc, lead, tin, copper, silver, and gold), the interlayer can be used to improve the wettability of the carbon fiber. If it is desired to avoid the inclusion of impurities such as titanium or silicon at some sacrifice in strength, it is of course possible to produce metal-coated carbon fibers without providing an interlayer. The material for forming the interlayer must be a material which does not diffuse into the matrix metal layer.

When the matrix metal is a metal that readily reacts with carbon fibers, preferred combinations of the matrix metal and the metal for forming the interlayer are tabulated below.

| Metal Matrix | Interlayer |
| --- | --- |
| Al | Ti, TiC, TiN, SiC, $Si_3N_4$ |
| Ni,Fe,Co | TiC, TiN, SiC, $Si_3N_4$ |
| Ti | SiC, $Si_3N_4$ |

Titanium reacts with carbon fibers, but can be used because it has a lower reactivity with carbon fibers than that of aluminum. When the matrix metal layer is titanium, the use of Si, TiC and TiN as an interlayer is unsuitable since these metals diffuse in the matrix layer into the carbon fibers. Likewise, when the matrix metal layer is nickel, iron or cobalt, the use of titanium or silicon as an interlayer is unsuitable.

Usually, the interlayer is very thin. Suitable thicknesses for the interlayer are about 0.01 to about 0.5μ. The thickness may be larger than 0.5μ, but if the interlayer becomes excessively thick, the proportion of the volume of the interlayer increases, and carbon fiber-reinforced metal obtained by using the assembly of the invention have reduced performance. The proportion of the volume of carbon fibers in the metal-coated carbon fiber assembly of this invention is determined according to the usage of the metal-coated carbon fibers. Generally, for obtaining a carbon fiber-reinforced metal of superior performance, the proportion of the carbon fibers is about 5 to about 70%, preferably 20 to 60%, by volume, calculated by the following relationship $$V_f = \frac{1}{\frac{\rho_{CF}}{\rho_M} \cdot \chi + 1} \times 100$$

$V_f$ is the fiber volume percent, $\rho_{CF}$ is the density of the carbon fiber, $\rho_M$ is the density of the metal and $\chi$ is the weight of the metal divided by the weight of the carbon fiber. If the volume proportion of the carbon fibers is lower than the above limit, the reinforcing effect is low, and if the volume proportion of the carbon fibers is higher than the above limit, it is difficult to form a carbon fiber-reinforced metal. The proportion should be within this range even when there is an interlayer.

In the assembly of this invention, fibers 25 coated with a metal contact each other partly, as shown in FIGS. 2-a and 2-b, and have bonded points 24 or 24' of the matrix metal at the points of contact. Accordingly, the orientation of individual fibers does not change, and the individual fibers can be aligned in fixed directions. Thus, the assembly may be maintained in an optional fixed shape such as sheet, tape or yarn. FIG. 2-a shows the arrangement of metal-coated carbon fibers in one direction (for example, in a sheet-like assembly), which are bonded to each other. FIG. 2-b shows the bonding of the fibers in an assembly of randomly aligned metal-coated carbon fibers, for example, a random web. FIG. 2-c is a sectional view of the bonded parts of the metal-coated carbon fibers shown in FIG. 2-a. In FIG. 2-c, reference numerals 11, 12 and 13 have the same meanings as in FIG. 1.

The assembly of this invention may be produced by any method which comprises coating carbon fibers with a metal, and bonding the metal-coated fibers partly by the metal thereby to form an assembly having a two-dimensional network structure or both a two-dimensional network structure and a three-dimensional network structure. However, an excellent process has now been successfully provided which involves coating carbon fibers with a matrix metal layer by ion plating or vacuum deposition thereby to form an assembly of the metal-coated carbon fibers.

Conventional methods for forming a matrix metal layer include, for example, a melt dip method (for example, as disclosed in U.S. Pat. Nos. 3,770,480 and 3,894,863), a plasma spray method and a plating method. According to the first of these methods, the range within which the proportion by volume of the carbon fibers can be controlled is very narrow. Moreover, since the fibers become a bundle when the fibers are withdrawn from the molten metal bath, the resultant metal-coated carbon fibers are not flexible, and have poor operability at the time of forming a carbon fiber-reinforced metal of complicated shapes. It is difficult in the second method to obtain a carbon fiber-reinforced metal having carbon fibers uniformly dispersed therein, because the carbon fibers are not uniformly coated with the metal. According to the third method, it is difficult to impart a fixed shape to the fibers, and the resultant metal-coated carbon fibers have poor operability in the production of a carbon fiber-reinforced metal. Furthermore, aluminum is extremely difficult to coat by this method. As a result, although these methods can be employed, they are less preferred.

In the assembly obtained using an ion plating process or a vacuum deposition process, the individual carbon fibers are each coated with the matrix metal. Hence, the assembly has a fixed shape and a moderate flexibility, and the defects associated with the three conventional methods described above are eliminated. Another advantage is that a good bonding is achieved between the carbon fibers and the metal, and the metal can be coated without oxidation occurring.

Figure 3:
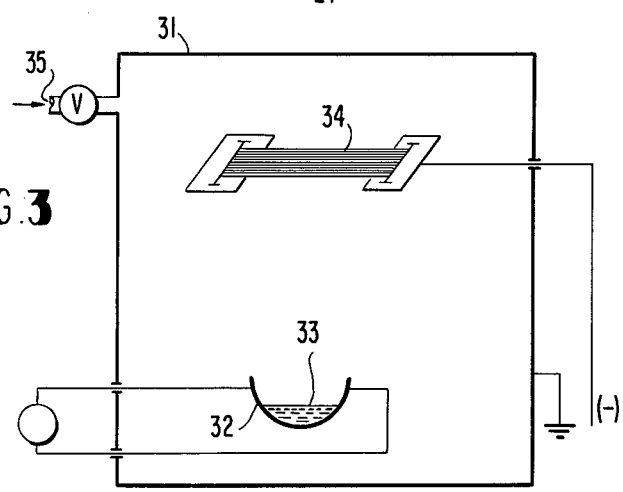
FIG. 3 is a view showing an apparatus for performing ion plating.

Formation of the matrix metal layer by the ion plating process is performed, for example, by using an apparatus of the type shown in FIG. 3. In FIG. 3, reference numeral 31 represents an air-tight chamber; 32, a crucible or a melting pot with a metal 33 therein; 34, carbon fibers or carbon fibers having an interlayer, which are disposed on a cathode or act themselves as a cathode; and 35, an opening for introducing an inert gas. The inside of the chamber 31 is maintained at a vacuum of about $1 \times 10^{-4}$ torr or a higher vacuum, and a voltage of about $-0.1$ to about $-3.0$ KV, preferably $-0.5$ to $-1.5$ KV, is applied to the cathode. An atmosphere of an inert gas, such as argon, helium, neon, krypton, or xenon with argon being preferred, is introduced into the system at a partial pressure of about $0.5 \times 10^{-2}$ to about $5 \times 10^{-2}$ torr, and a matrix metal is evaporated therein by resistance heating, heating by irradiation with electron beams, or high frequency induction heating, etc. The resultant metal vapor is activated (ionized) in a plasma region therein, and is condensed as a metal layer on the surfaces of the fibers disposed on the cathode or used as the cathode. The higher the temperature of the carbon fibers, the more compact is the metal layer formed. However, when a layer of a metal which will react with or dissolve therein the carbon fibers, such as aluminum, titanium or nickel, is to be formed on the surfaces of the carbon fibers, heating the carbon fibers will result in the formation of a carbide or the dissolution of the carbon fibers into the metal. It is desirable therefore that the carbon fibers on or as the cathode be preheated to a temperature which does not cause such difficulty, namely, to a temperature of about 500° C. or less, especially to a temperature in the range of 50 to 300° C. On the other hand, when a metal with which such a difficulty does not arise (e.g., copper, zinc or magnesium) is used, good results will be obtained if the carbon fibers are pre-heated to as high a temperature as possible below the melting point of the metal while consideration is given to the temperature increase of the fibers at the time of metal deposition.

Prior to the formation of the metal layer on the surfaces of the carbon fibers, preferably the fiber surfaces are etched. Etching can be carried out using known methods such as an electrolytic oxidation method (for example, as disclosed in U.S. Pat. No. 3,759,805), a method comprising treatment in an aqueous solution of sodium hydroxide, and a method comprising firing the surfaces of the fibers in oxygen (for example, as disclosed in U.S. Pat. No. 3,754,957). Plasma etching continuously carried out as a step prior to ion plating is especially preferred. This method comprises applying a discharge voltage of about $-0.5$ to about $-2.0$ KV in an atmosphere of an inert gas such as argon at about $0.5 \times 10^{-2}$ to about $5 \times 10^{-2}$ torr to cause a glow discharge, and etching the fiber surfaces using the resultant plasma. When this method is used, there is no particular need to pre-heat the fibers. Etching by this method removes the adhering matter on the fiber surfaces, such as dirt from the atmosphere or an oil film, and permits the metal layer to be directly formed on the surfaces of the carbon fibers.

Specific procedures for providing an interlayer by ion plating differ depending on the type of the interlayer. If it is desired to form an interlayer of silicon or titanium, the method is performed in the same way as in the formation of the metal layer described above. When the carbon fibers are pre-heated to about 600 to about 1500° C., preferably 800 to 1000° C., an interlayer of a carbide of the metal is formed. If the fibers are pre-heated to a temperature of up to about 500° C., and treated in a nitrogen atmosphere, an interlayer of a nitride of the metal is formed. In the case of forming nitrides it is not particularly necessary to pre-heat the carbon fibers to high temperatures, and they may be maintained at room temperature. When it is desired to form nitrides and carbides simultaneously, the temperature may be further increased, for example, to about 1500° C.

Figure 4:
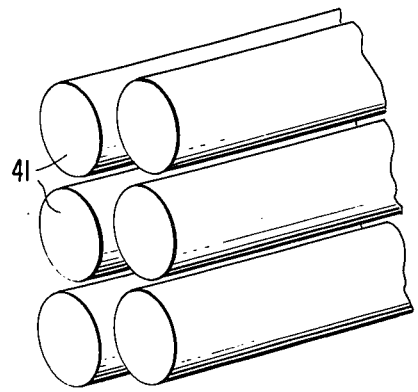
FIG. 4 is a perspective view showing the arrangement of carbon fibers at the time of coating them with a metal.

At the time of ion plating, long fibers are treated generally in the form of a bundle of fibers aligned in a fixed direction, whereas short fibers are treated as a random web. The length and width of such a bundle and web are not at all critical. However, the average number of fibers in the direction from the evaporation source to the fibers, namely in the thickness direction of the fiber bundle or random web, must be taken into consideration. FIG. 4 shows a part of the metal-coated fibers 41. In this drawing, the average number of fibers described above refers to the average number of fibers in the height direction. This average number is about 1 to about 10, preferably 3 to 5, in the case of ion plating. If the number exceeds about 10, carbon fibers at the center of the fiber bundle are not completely coated with metal. When the average number is about 1, the network structure is two-dimensional, or in one plane. When the average number is 2 or more, the network structure is three-dimensional and partly two-dimensional.

When the metal coated fibers do not have a sufficient fixed shape because of an insufficient number of points of adhesion between the fibers, the contact points of the fibers alone may be bonded under light pressure and slight temperature to fix the shape thereof. The pressure and temperature used for this purpose may be determined by simple experiments within ranges which will not cause a hardening of the resulting assembly.

The points bonded by the matrix metal are provided to an extent such that the assembly has a moderate flexibility and a fixed shape. When ion plating is carried out on fibers aligned in one direction, the width W of the fiber arrangement preferably ranges from about $nD/P$ to about $3nD/P$, especially preferably substantially $nD/P$, wherein D is the diameter of each fiber, n is the number of fibers, and P is the average number of fibers in the height direction of the fiber arrangement. The rate of metal deposition is about 0.5 to about 10 $\mu$/minute, preferably 1 to 5 $\mu$/minute, both in forming an interlayer and a matrix metal layer. In using a random web, the deposition rate is desirably within the above range. The fiber density of the web is optional.

Formation of a metal layer by vacuum deposition is performed by evaporating a metal in a vacuum of about $1 \times 10^{-4}$ torr or a higher vacuum without applying a voltage to the carbon fibers. Generally, the use of an inert gas is not required. Since the metal has no throwing power in vacuum deposition, it is necessary to evaporate the metal from both surfaces of a group of carbon fibers assembled. Prior to vacuum evaporation, the fiber surfaces are preferably plasma-etched to clean the fibers. The arrangement of fibers, the rate of metal deposition, and the temperature of the fibers may be the same as that used in the case of ion plating.

The vacuum deposition method cannot easily form a metal layer of uniform thickness around carbon fibers because the metal has no throwing power as stated above. An interlayer is therefore preferably formed by ion plating.

By producing the assembly of the present invention using the ion plating process or the vacuum deposition process, the presence of the matrix metal in an excessive proportion by volume in the resultant assembly or carbon fiber-reinforced metal produced therefrom is prevented, and moreover, the bonding between the carbon fibers and the metal can be made very intimate.

Figure 5:
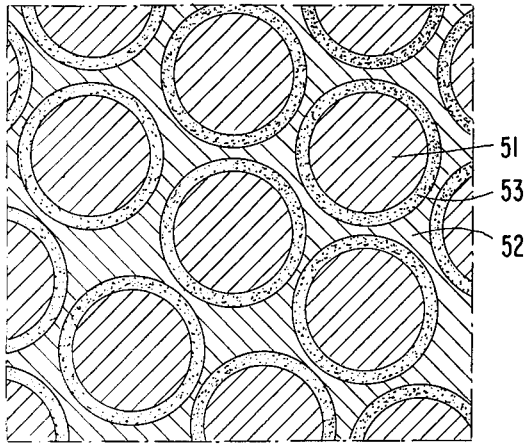
FIG. 5 is a partial sectional view of carbon fiber-reinforced metal obtained by using the assembly of this invention.

Since the assembly of this invention has a fixed shape, and a moderate flexibility, the assembly of this invention lends itself to very good handling in the production of a carbon fiber-reinforced metal. The carbon fiber-reinforced metal can be produced by stacking the required number of assemblies in the above-described shape in a desired mold, and heating them under pressure to melt and coalesce the metal. FIG. 5 shows a partial sectional view of the carbon fiber-reinforced metal. Reference numeral 51 represents carbon fibers; 53, an interlayer; and 52, a matrix metal layer.

If desired, a metal foil or a metal powder may be interposed between such assemblies. It is possible to hold the assembly, especially in sheet form, with metal sheets, and mold them into a sandwich structure.

Formation of a carbon fiber-reinforced metal can be performed using known methods. The conditions for forming a carbon fiber-reinforced metal differ depending on the matrix metal, but the operation is carried out in a vacuum of about $10^{-2}$ torr or a higher vacuum. When the assembly has an interlayer, no reaction takes place between the carbon fibers and the metal. Hence, the temperature of the assembly can be increased, and the pressure can be reduced. When the assembly does not contain an interlayer, the formation of a carbon fiber-reinforced metal is carried out under conditions which will not induce a reaction. Specifically, when the matrix metal does not react with carbon fibers or the assembly has an interlayer, a pressure of about 10 to about 100 kg/cm$^2$ at a temperature of from the melting point of the matrix metal to a point about 100° C. lower than the melting point is preferred in forming the carbon fiber-reinforced metal. If there is no interlayer, and the matrix metal reacts with or dissolves the carbon fibers, a pressure of about 100 to about 1000 kg/cm$^2$ at a temperature from a point about 100° C. lower than the melting point of the matrix metal to a point which is one-half of the melting point expressed in absolute temperatures is preferred in forming the carbon fiber-reinforced metal. the shaping time differs in both cases depending on the type of metal, the temperature, and the pressure, and is generally a time sufficient to provide constant mechanical properties in the resulting shaped product.

The assembly of metal-coated carbon fibers in accordance with this invention is easy to handle, and can be formed into a carbon fiber-reinforced metal in which the assembly is oriented in any desired direction and is present in any desired volume ratio.

The following Examples are given to illustrate the present invention in greater detail. All treatments were carried out at room temperature (about 20° C.) unless otherwise indicated and all parts, percentages, ratios and the like are by weight unless otherwise indicated.

EXAMPLE 1

In a vacuum system, non-twisted tows each consisting of 6000 carbon filaments having a diameter of 9.2 microns, a tenacity of 200 kg/mm$^2$ and a Young's modulus of 19.5 tons/mm$^2$ were aligned in a tape form in one row with the width being adjusted to 18 mm and the average number of fibers in the height direction being adjusted to 3. High purity aluminum was placed in the system, and the system was evacuated to a vacuum of less than $1 \times 10^{-4}$ torr. Then, argon gas was introduced into the system, and while maintaining the argon pressure at $2 \times 10^{-2}$ torr, a voltage of $-1.0$ KV was applied to the carbon fibers to perform plasma-etching of the carbon fibers for 5 minutes.

After etching, aluminum was evaporated by resistance heating, and deposited by ion plating on the carbon fibers held at 100° C. at a deposition rate of 1.0 $\mu$/minute. Thus, a tape-like assembly of carbon fibers having an aluminum coating with a thickness of 4 microns was obtained. The proportion of the carbon fibers in the assembly was 30% by volume.

Twenty such assemblies were stacked in one direction, and heated under pressure at 560° C. and 900 kg/cm$^2$ for 1 hour at a vacuum of $2 \times 10^{-5}$ torr to produce a carbon fiber-reinforced metal having a carbon fiber content of 31% by volume. The metal partly escaped from the system at the time of heating under pressure. The resulting carbon fiber-reinforced metal had a tenacity, in the direction of the fiber axis, of 46 kg/mm$^2$, and good electric conductivity.

EXAMPLE 2

In a similar manner to the procedure of Example 1, a random web which was composed of carbon fibers having a length of 1 to 4 cm with an average length of 2 cm and having a diameter of 9.0 microns, and with a web width of 11 mm and 5 single fibers on an average in the height direction, and titanium were placed in a vacuum system. Titanium was evaporated, and deposited by ion plating at a deposition rate of 0.5 $\mu$/minute. Then, at a vacuum of $5 \times 10^{-5}$ torr, copper was vacuum deposited onto both surfaces of the random web at a deposition rate of 3.0 $\mu$/minute.

The coated titanium layer was 0.1 micron thick, and the copper layer was 8.0 micron thick. The assembly contained the carbon fibers in a proportion of 13% by volume. Ten such assemblies were stacked, and heated under pressure at 1000° C. and 50 kg/cm$^2$ for 1 hour under a vacuum of $2 \times 10^{-4}$ torr. A carbon fiber-reinforced metal containing 15% by volume of the carbon fibers was obtained.

EXAMPLE 3

In a similar manner to the procedure of Example 1, 6000 carbon filaments having a diameter of 7.0 microns were aligned in a vacuum system in one direction in a tape form with a width of 14 mm and with the average number of fibers in the height direction being adjusted to 3. Titanium was also placed in the system. The system was evacuated to a vacuum of less than $1 \times 10^{-4}$ torr, and then nitrogen gas was introduced into the system. While maintaining the nitrogen pressure at $2 \times 10^{-2}$ torr, a voltage of $-1.0$ KV was applied to the carbon filaments to perform a plasma-etching of the filaments for 5 minutes.

After a lapse of 5 minutes, the carbon filaments were pre-heated to 200° C. using a tantalum heater. On the other hand, titanium was evaporated by resistance heating, and a titanium nitride coating was formed on the surfaces of the carbon filaments at a deposition rate of 0.5 $\mu$/minute. The thickness of the coating was 0.2 micron. Then, again, the system was evacuated to a vacuum of less than $1 \times 10^{-4}$ torr, and argon gas was introduced into the system. Using the same procedure as in Example 1, aluminum was deposited in a thickness of 2.5 microns by ion plating at a deposition rate of 1.0 $\mu$/minute. Thus, a tape-like assembly having a three-layer structure of carbon-titanium nitride-aluminum was obtained.

Fifty such assemblies were stacked up, and heated under pressure at 650° C. and 50 kg/cm² for 30 minutes under a vacuum of $5 \times 10^{-5}$ torr to produce a carbon fiber-reinforced metal having a matrix of aluminum. The resultant carbon fiber-reinforced metal contained 35% by volume of the carbon fibers and had a tenacity, in the direction of the fiber axis, of 58 kg/mm².

While the invention has been described in detail and with reference to specific embodiments thereof, it will be apparent to one skilled in the art that various changes and modifications can be made therein without departing from the spirit and scope thereof.

What is claimed is:

1. An assembly of a plurality of carbon fibers each coated with a matrix metal layer, the coated fibers having bonding points at the metal layers to form a two-dimensional network structure or both a two-dimensional network structure and a three-dimensional network structure, said bonding points being present to such an extent that individual carbon fibers do not substantially change in orientation with each other upon handling and said assembly can be handled without deviations among the individual fibers.

2. The assembly of claim 1, wherein the matrix metal is aluminum, titanium, magnesium, zinc, lead, tin, nickel, iron, cobalt, copper, silver or gold.

3. The assembly of claim 1, wherein said matrix metal-coated carbon fibers include an interlayer of titanium or silicon or a carbide or nitride thereof interposed between the matrix metal layer and the carbon fiber.

4. The assembly of claim 3, wherein the matrix metal is aluminum, and the interlayer is Ti, TiC, TiN, SiC or $Si_3N_4$.

5. The assembly of claim 3, wherein the matrix metal is nickel, iron or cobalt, and the interlayer is TiC, TiN, SiC or $Si_3N_4$.

6. The assembly of claim 3, wherein the matrix metal is titanium, and the interlayer is SiC or $Si_3N_4$.

7. The assembly of claim 3, wherein the matrix metal is magnesium, zinc, lead, tin, copper, silver or gold, and the interlayer is Ti, Si, TiC, TiN, SiC or $Si_3N_4$.

8. The assembly of claim 1, wherein the carbon fibers have a diameter of about 5 to about 10 microns.

9. The assembly of claim 1, wherein the carbon fibers are present in an amount of about 5 to about 70% by volume.

10. The assembly of claim 3, wherein the interlayer has a thickness of about 0.01 to about 0.5 micron.

11. The assembly of claim 1, wherein the carbon fibers are aligned in one direction.

12. The assembly of claim 1, wherein the carbon fibers form a random web.

13. A process for producing an assembly of metal-coated carbon fibers having a two-dimensional network structure or both a two-dimensional network structure and a three-dimensional network structure, which comprises coating carbon fibers with a matrix metal layer by ion plating or vacuum deposition, and point bonding the metal-coated carbon fibers by the metal, said bonding points being present to such an extent that individual carbon fibers do not substantially change in orientation with each other upon handling and said assembly can be handled without deviations among the individual fibers.

14. The process of claim 13, wherein the starting carbon fibers are aligned in one direction to form a fiber bundle.

15. The process of claim 14, wherein the width, W, of the fiber bundle is adjusted to about nD/P to about 3nD/P wherein D is the diameter of each carbon fiber, n is the number of carbon fibers, and P is the average number of fibers in the thickness direction and is a positive number of 1 to 10.

16. The process of claim 13, wherein the starting carbon fibers are in the form of a random web.

17. The process of claim 16, wherein the fibers forming the random web have a length of about 1 to about 15 cm.

18. The process of claim 16, wherein the average number of fibers in the thickness direction of the random web is about 1 to about 10.

19. The process of claim 13, wherein the metal deposition rate in the ion plating or vacuum deposition is about 0.5 to about 10$\mu$ per minute.

20. The process of claim 13, wherein the ion plating is carried out in an atmosphere of an inert gas at a partial pressure of about $0.5 \times 10^{-2}$ to $5 \times 10^{-2}$ torr in a vacuum at about $1 \times 10^{-4}$ torr or a higher vacuum.

21. The process of claim 13, wherein the vacuum deposition is carried out in a vacuum of about $1 \times 10^{-4}$ torr or a higher vacuum.

22. The process of claim 20, wherein the carbon fibers are disposed on a cathode or used as a cathode, and the ion plating is carried out by applying a voltage of about $-0.1$ to about $-3.0$ KV between the cathode and the metal ion plating source.

23. The process of claim 13, wherein, prior to the ion plating or vacuum deposition, said process includes plasma-etching the carbon fibers.

24. The process of claim 13, including preheating the carbon fibers prior to the ion plating or vacuum deposition.

25. The process of claim 13, wherein prior to coating the carbon fibers with the matrix metal, the process includes forming an interlayer of titanium or silicon, or a carbide or nitride thereof on the surfaces of the carbon fibers.

26. The process of claim 25, including preheating the carbon fibers to about 600 to about 1500° C., and depositing titanium or silicon by ion plating to form an interlayer of a carbide of titanium or silicon.

27. The process of claim 25, including depositing titanium or silicon by ion plating in an atmosphere of nitrogen, with or without preheating the carbon fibers to a temperature of up to about 500° C., thereby to form an interlayer of a nitride of titanium or silicon.

28. A process which comprises stacking a plurality of assemblies of claim 1, and then shaping the stack under heat and pressure.

29. The process of claim 28, wherein the coating of the carbon fibers with the matrix metal is by ion plating or vacuum deposition.

30. The process of claim 29, wherein the matrix metal is a metal which does not react with the carbon fibers, and the process includes shaping the stack under a vacuum of about $10^{-2}$ torr or a higher vacuum at a temperature from the melting point of the matrix metal to a temperature about 100° C. lower than the melting point under a pressure of about 10 to about 100 kg/cm².

31. The process of claim 29, wherein the matrix metal-coated carbon fibers have an interlayer of titanium or silicon or a carbide or nitride thereof between the matrix metal layer and the carbon fiber, and the process includes shaping the stack under a vacuum of about $10^{-2}$ torr or a higher vacuum at a temperature of from the melting point of the matrix metal to a temperature about 100° C. lower than the melting point of the matrix metal under a pressure of about 10 to about 100 kg/cm$^2$.

32. The process of claim 29, wherein the matrix metal is a metal which reacts with or dissolves the carbon fibers, and the process includes shaping the stack in a vacuum of about $10^{-2}$ torr or a higher vacuum at a temperature of from a temperature about 100° C. below the melting point of the matrix metal to a temperature which is one-half of the melting point expressed in terms of absolute temperatures under a pressure of about 100 to about 1000 kg/cm$^2$.

33. The process of claim 13, wherein the starting carbon fibers are aligned in one direction to form a fiber bundle, wherein the width, W, of the fiber bundle is adjusted to about nD/P to about 3nD/P wherein D is the diameter of each carbon fiber, n is the number of carbon fibers, and P is the average number of fibers in the thickness direction and is a positive number of 1 to 10, and wherein the metal deposition rate in the ion plating or vacuum deposition is about 0.5 to about 10$\mu$ per minute.

34. The process of claim 13, wherein the starting carbon fibers are in the form of a random web, said fibers having a length of about 1 to about 15 cm, and wherein the metal deposition rate in the ion plating or vacuum deposition is about 0.5 to about 10$\mu$ per minute.

35. The assembly of claim 3, wherein said interlayer is a nitride of titanium or silicon.

36. The process of claim 13, wherein said interlayer is a nitride of titanium or silicon.

37. The process of claim 13, wherein said coating is by ion plating.

38. The assembly of claim 1, wherein said assembly is adapted for further processing to form carbon-fiber reinforced metals, said carbon fibers in said assembly, while being coated with said matrix metal, are discrete from each other and merely contact each other by point bonding at said bonding points, being separated from each other by areas free from said matrix metal at non-bonded areas.

39. The process of claim 13, wherein said assembly is adapted for further processing to form carbon-fiber reinforced metals, said carbon fibers in said assembly, while being coated with said matrix metal, are discrete from each other and merely contact each other by point bonding at said bonding points, being separated from each other by areas free from said matrix metal at non-bonded areas.

* * * * *